Patented Aug. 24, 1943

2,327,771

UNITED STATES PATENT OFFICE 2,327,771

AMINOTRIAZINE - ALDEHYDE - HALOGENATED ACETONE CONDENSATION PRODUCT

Gaetano F. D'Alelio, Pittsfield, Mass., assignor to General Electric Company, a corporation of New York No Drawing. Application January 15, 1941, Serial No. 374,561

20 Claims. (Cl. 260—42)

This invention relates to new condensation products and to methods of making the same. The invention is concerned more particularly with self-curing aminoplasts, by which are meant heat-convertible resinous condensation products prepared from amino or amido compounds and having the characteristic property of curing under heat or under heat and pressure to the insoluble, infusible state without the addition of a curing accelerator or catalyst.

This application is a continuation-in-part of my co-pending application Serial No. 289,276, filed August 9, 1939, now Patent No. 2,323,898, issued July 13, 1943, and assigned to the same assignee as the present invention. In that application I disclosed and claimed new and useful compositions of matter comprising the condensation product of a mixture comprising (that is, of ingredients comprising) a urea, specifically the compound corresponding to the formula $CO(NH_2)_2$, an aliphatic aldehyde, e. g., formaldehyde, and a halogenated ketone, specifically a halogenated acetone. I also disclosed in that application that, instead of a urea, I may use a triazine derivative. The present invention is directed to new and useful condensation products of ingredients comprising an aminotriazine (amidogentriazine), an aldehyde, for example formaldehyde or other active methylene-containing body, and a halogenated ketone of the kind above mentioned.

In the production of aminoplasts it has heretofore been common practice in coverting such materials to the insoluble, infusible state to incorporate into the condensation product or into the molding composition a latent or an active (direct) curing catalyst. As pointed out more particularly hereafter, this technique and the final products have not been wholly satisfactory.

I have discovered that self-curing aminoplasts can be produced by condensing an aminotriazine (that is, an aldehyde-reactable aminotriazine), an aldehyde or an aldehyde-addition product, specifically formaldehyde, methylol ureas (a urea containing a methylol radical), methylol aminotriazines, etc., and a halogenated ketone, more particularly a halogenated acetone, e. g., chloroacetone (monochloroacetone), dichloroacetone, bromoacetone (monobromoacetone), etc. The initial condensation may be carried out at normal or at elevated temperatures, in the presence or absence of a condensation catalyst and under alkaline, neutral or acid conditions.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from imperfections, such as blisters, discolorations, etc. Such imperfections are due usually to localized curing that often occurs in resinous materials of the admixed catalyst type. As the value of the molded article, especially light-colored articles, is materially influenced by its appearance, it is clear that the discovery of any means for decreasing or eliminating entirely the production of imperfect articles which must be scrapped or sold at reduced price is of considerable commercial importance.

The resin syrups and molding compositions of this invention may be stored for long periods of time without material alteration. In marked contrast the prior heat-convertible aminoplasts of the aminotriazine type (that is, condensation products of aminotriazines and aldehydes, e. g., formaldehyde or other active methylene-containing bodies), more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and, in general, meet the strength, hardness and other requirements of the particular service application.

In carrying the present invention into effect the condensation reaction between the components preferably is started under neutral or alkaline conditions. Neutral conditions may be established by neutralizing (if necessary) either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter the solution is treated to eliminate acidic conditions due to acid or acid salts. That is, the mass is neutralized or is made alkaline by adding an alkaline substance. The reaction is then caused to proceed further to produce the self-curing aminoplasts of this invention.

In obtaining the neutral, alkaline or acid conditions above described, I may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, etc., or mixtures of acids, of acid salts, or of acids and acid salts.

Various ways may be employed for effecting initial reaction between the components. For example, I may first mix all the reactants and effect condensation between the mixed reactants in the presence or absence of addition agents, as for instance, condensation catalysts, fillers, plasticizers, other natural or synthetic resinous bodies, solvents or diluents, etc. Alternatively, I may add the halogenated ketone to a partial condensation product of an aminotriazine and an aldehyde and effect further condensation between the components. In producing such a partial condensation product I prefer to cause the condensation reaction between the aminotriazine and the aldehyde to take place in the presence of a primary condensation catalyst and a secondary condensation catalyst. The primary catalyst advantageously is a member of the class consisting of (1) nitrogen-containing basic tertiary compounds that are aldehyde-non-reactable, e. g., tertiary amines such as trialkyl (for example, trimethyl, triethyl, etc.) amines, triaryl (for example, triphenyl, etc.) amines, etc., and (2) nitrogen-containing basic compounds that are aldehyde-reactable, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of primary catalyst, should be a fixed alkali, for instance a carbonate, cyanide or hydroxide of an alkali metal (e. g., sodium, potassium, lithium, etc.).

Another method of effecting reaction between the ingredients comprises first condensing the halogenated ketone with an aldehyde, e. g., formaldehyde or other active methylene-containing body, adding the resulting product to a partial condensation product of an aminotriazine and an aldehyde and then causing the reaction to proceed further. Or, I may condense or partially condense the halogenated ketone with a mol excess of an aldehyde, add an aminotriazine to this condensation product and effect further reaction between the components. Or, I may partially condense the halogenated ketone with an excess of an aminotriazine and add to this condensation product one mol of an aldehyde for each mol excess of aminotriazine present and effect further condensation. Still other ways may be employed in combining the components and in producing the unmodified and modified condensation products of this invention, as will be readily understood by those skilled in the art as the description of the invention proceeds. These condensation reactions may proceed under a wide variety of time, temperature and pressure conditions. The temperature of reaction may vary from room temperature to the reflux temperature of the reactants at reduced, atmospheric or superatmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified and unmodified resinous masses are self-convertible under heat or under heat and pressure to the insoluble, infusible state.

Depending upon the particular reactants employed and the particular conditions of reaction, these intermediate condensation products vary from clear, colorless, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentration. The liquid compositions may be used, for instance, as surface-coating materials, in the production of paints, varnishes, lacquers, enamels, etc., for general adhesive applications, in producing laminated articles and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration. All parts are by weight.

*Example 1*

| | Parts |
|---|---|
| Melamine | 63.0 |
| Aqueous solution of formaldehyde (approximately 37.1% HCHO) | 140.0 |
| Aqueous ammonia (28% $NH_3$) | 3.0 |
| Sodium hydroxide in 15 parts water | 0.06 |
| Chloroacetone | 0.5 |

All of the above components with the exception of the chloroacetone were mixed and heated under reflux at the boiling temperature of the mass for 10 minutes. The stated amount of chloroacetone was now added and heating under reflux was continued for 5 minutes to cause the chloroacetone to intercondense with the melamine-formaldehyde partial condensation product. The hot resinous syrup was mixed with 67 parts alpha cellulose in flock form and 0.4 part of a mold lubricant, specifically zinc stearate, to form a molding (moldable) compound. The wet compound was dried at 67° C. for 2 hours. The dried compound was molded for 3 minutes at 130° C. under a pressure of 2,000 pounds per square inch. The molded pieces could be pulled hot from the mold without distortion. They were hard and well cured throughout and had excellent gloss, color and surface appearance.

*Example 2*

Exactly the same formula and procedure were followed as described under Example 1 with the exception that 0.15 part alpha, alpha prime dichloroacetone (symmetrical dichloroacetone) was used in place of the chloroacetone and the molding time at 130° C. was only 2 minutes. Well-cured molded articles of excellent gloss and color were obtained.

Example 3

| | Parts |
|---|---|
| Melamine | 31.5 |
| Urea | 15.0 |
| Aqueous solution of formaldehyde (approximately 37.1% HCHO) | 100.0 |
| Aqueous ammonia (28% NH$_3$) | 3.0 |
| Sodium hydroxide in 3 parts water | 0.06 |
| Alpha, alpha prime dichloroacetone | 0.114 |

All of the above components with the exception of the alpha, alpha prime dichloroacetone were heated together under reflux at boiling temperature for 30 minutes. The chlorinated acetone was now added and the mixture was heated to boiling temperature. The hot resinous syrup was mixed with 47.5 parts alpha cellulose in flock form and 0.4 part zinc stearate to form a molding compound. The wet compound was dried at 63° C. for 3 hours and then at 75° C. for 1½ hours. The dried compound was molded for 2 minutes at 130° C. under a pressure of 2,000 pounds per square inch. The molded pieces could be pulled hot from the mold without distortion. They were well cured throughout and of good surface appearance.

Example 4

| | Parts |
|---|---|
| Melamine | 31.5 |
| Thiourea | 19.0 |
| Aqueous solution of formaldehyde (approximately 37.1% HCHO) | 100.0 |
| Aqueous ammonia (28% NH$_3$) | 3.0 |
| Sodium hydroxide in 3 parts water | 0.06 |
| Alpha, alpha prime dichloroacetone | 0.12 |

The same procedure was followed as described under Example 3 with the exception that the initial components (in the absence of the chlorinated acetone) were heated under reflux for 15 minutes to form the melamine-thiourea-formaldehyde partial condensation product. After adding the alpha, alpha prime dichloroacetone and bringing the reaction mass to boiling temperature, the resulting syrup was mixed with 49 parts alpha cellulose in flock form and 0.4 part zinc stearate to form a molding composition. The wet compound was air dried at room temperature until sufficiently freed of moisture for proper molding. Well-cured molded articles were obtained when the dried compound was molded at 130° C. under a pressure of 2,000 pounds per square inch. The molded pieces had excellent resistance to water.

Example 5

| | Parts |
|---|---|
| Melamine | 47.25 |
| Dicyandiamide | 10.5 |
| Aqueous solution of formaldehyde (approximately 37.1% HCHO) | 120.0 |
| Aqueous ammonia (28% NH$_3$) | 3.0 |
| Sodium hydroxide in 3 parts water | 0.06 |
| Alpha, alpha prime dichloroacetone | 0.204 |

All of the above components with the exception of the alpha, alpha prime dichloroacetone were heated together under reflux at the boiling temperature of the mass for 15 minutes, after which the chlorinated acetone was added and the mass was brought to boiling temperature. The resulting hot syrup was mixed with 61 parts alpha cellulose in flock form and 0.4 part zinc stearate to form a molding compound. The wet compound was dried at room temperature until sufficiently moisture-free for proper molding. The dried compound was molded at 140° C. under a pressure of 2,000 pounds per square inch. The molded pieces were well cured throughout.

It will be understood, of course, that the halogenated ketones mentioned in the above examples are only by way of illustration and that various other halogenated ketones, more particularly halogenated acetones, may be used in carrying my invention into effect e. g., trichloroacetone, monobromoacetone, dibromoacetone and tribromoacetone.

When high boiling halogenated ketones are added to a partial condensation product of an aminotriazine and an aldehyde, e. g., formaldehyde or other active methylene-containing body and not refluxed but are heated to effect drying simultaneously with further condensation, good self-curing resins are obtained. When low-boiling halogenated ketones are used in this way, the halogenated ketone tends to distill off before the condensation reaction is complete. In practicing my invention I prefer, because of economic factors, to use in large part low-boiling halogenated ketones, such as chloroacetone. Therefore it is desirable that these compounds be condensed into the mass by heating under reflux.

It also will be understood that in each of the specific halogenated ketones above mentioned the particular halogen shown in any specific formula may be replaced by some other halogen, care being taken in the choice of the halogen in the light of the properties desired in the final product. For example, when light-colored molded articles are desired, the use of iodoketones should be avoided and when the heat-curable resins are to be used in the production of molding compositions, the fluoroketones preferably are avoided.

Where a plurality of halogen atoms are present in the ketone molecule, these may be the same or different. For example, one halogen in the molecule may be chlorine and another bromine. In this way it is possible to obtain a heat-convertible resin of self-curing characteristics, and other properties best adapted to meet a particular molding problem and service application of the finished article.

Likewise, it also will be understood that the aminotriazine named in the above examples (melamine) is by way of illustration and that any other aldehyde-reactable aminotriazine (amidogentriazine) may be employed. I prefer to use triazines containing either at least one unsubstituted amidogen (—NH$_2$) group or a plurality of partly substituted amidogen groups. Examples of such triazines which may be used in producing the new synthetic materials of this invention are ammeline, ammelide, formoguanamine, 2-amino-1,3,5-triazine and its substitution products; derivatives of melamine, e. g., 2,4,6-trihydrazino - 1,3,5 - triazine, melam, melon, 2,4,6-triethyltriamino - 1,3,5 - trazine, 2,4,6 - triphenyltriamino - 1,3,5-triazine, etc.; nuclearly substituted aminotriazines, e. g., 1-cyano-2-amino-4,6-dimethyl-1,3,5-triazine, 2-chloro-4,6-diamino-1,3,5-triazine, 6-methyl-2,4 - diamino-1,3,5 - triazine, 2 - alkyl - 4 - amino - 6 - hydroxy-1,3,5-triazines (e. g., 2-methyl-4-amino-6-hydroxy-1,3,5-triazine, etc.), 2-aryl-4-amino-6-hydroxy-1,3,5-triazines (e. g., 2-phenyl-4-amino-6-hydroxy-1,3,5-triazine, etc), 2-phenyl-p-oxy-4,6-diamino-1,3,5-triazine; poly-amino triazines wherein the hydrogen atoms of one or all of the amino groups are partially substituted by other amino groups, e. g., 2,4-diamino-6-hydrazino-1,3,5-triazine, 2-amino-4,6-dihydrazino- 1,3,5-triazine, 2,4,6-trihydrazino - 1,3,5-triazine, etc.; poly-amino triazines wherein the hydrogen atoms of one or all of the amino groups are partially substituted by other monovalent substituents (e. g., alkyl, aryl, aralkyl, alkaryl, etc.), for instance 2-amino-4,6-diethylamino-1,3,5-triazine, 4-amino-2,6-diphenylamino - 1,3,5 - triazine, 2-methylamino-4-amino-6-chloro - 1,3,5-triazine, 2,4 - diamino - 6 - phenylamino-1,3,5-triazine, symmetrical trialkyl and triaryl melamines; the amidogen 1,2,3-triazines and the amidogen 1,2,4-triazines, specifically the amino (—NH₂) and the carbamyl (—CONH₂) and the thiocarbamyl (—CSNH₂) 1,2,3- and 1,2,4-triazines. Additional examples of amidogen 1,3,5-triazines are given below:

2-carbamido-4,6-diamino-1,3,5-triazine
2,4-dicarbamido-6-amino-1,3,5-triazine
2,4,6-tricarbamido-1,3,5-triazine
2-thiocarbamido-4,6-diamino-1,3,5-triazine
2,4-dithiocarbamido-6-amino-1,3,5-triazine
2,4,6-trithiocarbamido-1,3,5-triazine
Carbimido and thiocarbimido derivatives of 1,3,5-triazines corresponding to the above carbamido and thiocarbamido derivatives
2-semicarbazido-4,6-diamino-1,3,5-triazine
2,4-di(para-benzamide)-6-amino-1,3,5-triazine
2,4,6-tri-(semicarbazido)-1,3,5-triazine
2-(para-benzamide)-4,6-diamino-1,3,5-triazine
2,4,6-tri-(para-benzamide)-1,3,5-triazine
2,4-di-(para-benzamide)-6-amino-1,3,5-triazine
2-(ortho-phenylsulfonamide)-4,6-diamino-1,3,5-triazine
2,4 - di-(ortho-phenylsulfonamide) - 6 - amino-1,3,5-triazine
2,4,6-tri-(ortho-phenylsulfonamide)-1,3,5 - triazine
Meta-phenylsulfonamide and para-phenylsulfonamide derivatives of 1,3,5-triazines corresponding to the above ortho-phenylsulfonamide derivatives.

Other examples of amidogen triazines are the amidogen 1,2,3- and 1,2,4-triazines corresponding to the above amidogen 1,3,5-triazines. Additional examples of amidogen triazines which may be used in carrying the present invention into effect are given in various copending applications of mine, for example application Serial No. 404,661, filed July 30, 1941, now Patent No. 2,312,688, issued March 2, 1943, and assigned to the same assignee as this invention. The preferred class of triazine derivatives used in carrying the present invention into effect are the 2,4,6-amidogen-1,3,5-triazines.

In producing these new condensation products the choice of the aldehydic reactant is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. For some applications I may use, for instance, acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes. Examples of aldehyde-addition products that may be used instead of the aldehydes themselves are the formaldehyde-addition products of urea, thiourea and iminourea and of substituted ureas, thioureas and iminoureas (e. g., mono- and di-methylol ureas and thioureas) and the formaldehyde-addition products of the aminotriazines (e. g., mono-, di-, tri-, tetra-, penta- and hexa-methylol melamines). Mixtures of aldehydes and aldehyde-addition products may be employed, e. g., mixtures of formaldehyde and methylol compounds such, for instance, as dimethylol urea and trimethylol melamine.

As shown by Examples 3, 4 and 5, a part of the aminotriazine reactant may be replaced, if desired, by a urea, e. g., urea itself, thiourea, iminourea and their aldehyde-reactable substitution products, numerous examples of which latter are given in my copending application Serial No. 289,276. I may use either a single or a plurality of halogenated acetones with the aminotriazine reactant or with the aminotriazine and urea reactants. Various aminodiazines or aminodiazoles also may be used in place of a part of the aminotriazine reactant.

The ratio of the reactants to each other may be considerably varied, but, in general, it is desirable to use at least one mol of an aldehyde, e. g., formaldehyde or other active methylene-containing body, for each mol of mixed (total) ketone and aminotriazine, or at least one mol of mixed (total) aldehyde and ketone for each mol of aminotriazine. In producing the heat-convertible resinous condensation products of this invention, the proportion of halogenated ketone in all cases is at least sufficient to impart self-curing characteristics to the resin. Ordinarily not exceeding substantially ¼ mol halogenated ketone is used for each mol of aminotriazine. No advantage ordinarily accrues from using an amount of halogenated ketone above the minimum required to secure the desired curing rate. Further, the use of higher amounts of halogenated ketone is undesirable for most molding applications because of the greater difficulty in obtaining molded articles of suitable hardness, but may not be objectionable for other applications of the material. Also, in some cases, particularly where high molecular weight halogenated ketones, as for example alpha halogenated methyl octadecyl ketone, are used, the halogenated ketone exceeds on a weight basis the aminotriazine portion of the molecule. Consequently, in such cases the inherent characteristics (for example, waxy nature) of the high molecular weight halogenated ketone predominate in the resin molecule. This may be objectionable in some applications of the molded part, for example where resistance to the ordinary organic solvents is required.

From the foregoing it will be seen that the particular mol ratio of halogenated ketone to the other components is dependent somewhat upon the inherent characteristics of the halogenated ketone and the curing characteristics and other properties desired in the heat-curable and heat-cured resinous condensation products. For molding applications the ratio of the aldehydic reactant to the aminotriazine may be considerably varied, but generally will be within the range of 1½ to 3¼ mols aldehyde, e. g., formaldehyde, for each mol of aminotriazine. No particular advantage ordinarily accrues from the use of higher amounts of aldehyde. Taking melamine (an aminotriazine containing three unsubstituted amidogen groups) as illustrative of the aminotriazine, particularly good results are obtained with approximately three mols aldehyde, e. g., formaldehyde, for each mol melamine. If the aminotriazine contains only two unsubstituted amidogen groups (or one unsubstituted and two partly substituted amidogen groups), then one advantageously may use approximately two mols aldehyde for each mol of an aminotriazine. If the aminotriazine contains only one unsubstituted amidogen group (or two partly substituted amidogen groups), then no particular advantage usually accrues from using much in excess of one mol aldehyde for each mol of such an aminotriazine.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, amyl, etc., alcohols; polyhydric alcohols such as ethylene glycol, diethylene glycol, glycerine, pentaerythritol, etc.; amides such as formamide, acetamide, stearamide, acryloamide, benzamide, toluene sulfonamides, benzene disulfonamides, benzene trisulfonamides, adipic diamide, phthalamide, etc.; amines such as ethylene diamine, aniline, phenylene diamine, etc.; phenols; aminophenols; ketones other than the hereindescribed halogenated ketones; nitriles, e. g., acrylonitrile, methacrylonitrile, succinonitrile, etc.; and others.

The modifying bodies also may take the form of high molecular weight bodies with or without resinous characteristics, for example hydrolyzed wood products, formalized cellulose derivatives, lignin, proteins, protein-aldehyde condensation products, aminodiazine- and aminodiazole-aldehyde condensation products, phenol-aldehyde condensation products, urea-aldehyde condensation products, aniline-aldehyde condensation products, furfural condensation products, modified or unmodified, saturated or unsaturated polyhydric alcohol-polybasic acid condensation products, sulfonamide-aldehyde resins, water-soluble cellulose derivatives, natural gums and resins such as shellac, rosin, etc.; polyvinyl compounds such as polyvinyl alcohol, polyvinyl acetate, polyvinyl acetals, specifically polyvinyl formal, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide molding compositions best fitted to yield molded articles of optimum properties for the particular service application.

The molding compositions of this invention may be molded into a variety of shapes under heat and pressure, more particularly at temperatures of the order of 100° to 200° C., preferably from 120° to 180° C. Molding pressures may be varied considerably, but usually are within the range of 1,000 to 10,000 pounds per square inch, more particularly from 2,000 to 4,000 or 5,000 pounds per square inch.

From the foregoing description it will be seen that the present invention provides new and useful compositions of matter comprising a condensation product (in heat-curable or heat-cured state) of ingredients comprising essentially an aminotriazine (amidogentriazine), e. g., melamine, an aldehyde (including polymeric aldehydes and aldehyde-addition products), e. g., formaldehyde, paraformaldehyde, dimethylol urea, etc., and at least one halogenated acetone. The scope of the invention also includes method features for the production of such condensation products. For instance, one method feature of the invention comprises effecting partial reaction between ingredients comprising an aminotriazine, specifically melamine, an aldehyde or an aldehyde-addition product, specifically formaldehyde or dimethylol urea (or ingredients comprising a urea, specifically $NH_2CONH_2$, an aminotriazine and an aldehyde or an aldehyde-addition product), in the presence of an alkaline condensation catalyst, specifically a condensation catalyst comprising ammonia and a fixed alkali, adding a small amount of one or more of the hereindescribed halogenated ketones, e. g., a halogenated acetone such as chloroacetone, to the resulting partial condensation product and causing the halogenated acetone to intercondense with the said partial condensation product. My invention also provides thermosetting (heat-hardenable) molding compositions comprising a filler, e. g., a cellulosic filler, and a heat-curable condensation product of this invention, e. g., a heat-hardenable (heat-curable) condensation product of ingredients comprising melamine (or urea and melamine), formaldehyde or compounds engendering formaldehyde and a halogenated acetone, specifically a chlorinated acetone (mono-, di- or tri-chloroacetone), as well as molded articles of manufacture comprising the heat-set molding compositions.

The modified and unmodified resinous compositions of this invention have a wide variety of uses. For example, in addition to their use in the production of molding compositions, they may be used as laminating varnishes in the production of laminated articles wherein sheet materials, e. g., paper, cloth, sheet asbestos, etc., are coated and impregnated with the resin, superimposed, and thereafter united under heat and pressure. They also may be used in the production of wire or baking enamels, for bonding or cementing together mica flakes to form a laminated mica article, for bonding together abrasive grains in the production of resin-bonded abrasive articles such, for instance, as grindstones, sandpapers, especially those intended for wet-sanding operations, in the manufacture of electrical resistors, etc. They also may be used as fire retardants and sizings, for instance in the treatment of cotton, linen and other cellulosic materials. They also may be used as impregnants for electrical coils. The cured resinous products have a high dielectric strength and outstanding resistance to heat, moisture and arcing. Hence they are especially adapted for use in electrically insulating applications wherein solid insulation possessing these characteristics is particularly desirable.

What I claim as new and desire to secure by Letters Patent of the United States is:

1. A composition of matter comprising the condensation product of ingredients comprising essentially an aminotriazine, an aldehyde and a halogenated acetone.

2. A composition of matter comprising an alcohol-modified condensation product of ingredients comprising an aminotriazine, an aldehyde and at least one halogenated acetone.

3. A heat-curable resinous condensation product of ingredients comprising essentially an aminotriazine, formaldehyde and at least one halogenated acetone.

4. A product comprising the heat-cured resinous condensation product of claim 3.

5. A composition comprising a condensation product of ingredients comprising an aminotriazine, a urea containing a methylol radical, and at least one halogenated acetone.

6. A heat-curable resinous composition comprising a soluble, fusible condensation product of ingredients comprising the following components in the stated mol ratios: 1 mol of an aminotriazine, from 1½ to 3¼ mols formaldehyde and not exceeding substantially ¼ mol of a halogenated acetone.

7. A product comprising the cured resinous composition of claim 6.

8. A composition as in claim 1 wherein the aminotriazine is melamine and the aldehyde is formaldehyde.

9. A heat-curable resinous condensation product of ingredients comprising urea, melamine, formaldehyde and a halogenated acetone.

10. A product comprising the heat-cured resinous condensation product of claim 9.

11. A composition comprising the product of reaction of (1) a partial condensation product obtained by reaction, while admixed with an alkaline substance, of ingredients comprising an aminotriazine and formaldehyde and (2) a halogenated acetone.

12. A composition comprising the reaction product of ingredients comprising an aminotriazine, an aldehyde and a chlorinated acetone.

13. A composition comprising the product of reaction of ingredients comprising an aminotriazine, formaldehyde and a chlorinated acetone.

14. A composition comprising the product of reaction of ingredients comprising an aminotriazine, dimethylol urea and a chlorinated acetone.

15. A composition comprising the product of reaction of ingredients comprising urea, melamine, formaldehyde and a chlorinated acetone.

16. A thermosetting molding composition comprising a filler and a heat-hardenable condensation product of ingredients comprising an aminotriazine, formaldehyde and a halogenated acetone.

17. A heat-hardenable molding composition comprising a cellulosic filler and a heat-curable condensation product of ingredients comprising melamine, formaldehyde and a chlorinated acetone.

18. A product comprising the heat-hardened molding composition of claim 17.

19. The method of preparing new condensation products which comprises effecting reaction between ingredients comprising essentially an aminotriazine, an aldehyde and a halogenated acetone.

20. The method which comprises effecting partial reaction between ingredients comprising melamine, urea and formaldehyde in the presence of a condensation catalyst comprising ammonia and a fixed alkali, adding a small amount of a chlorinated acetone to the resulting partial condensation product and causing the chlorinated acetone to intercondense with the said partial condensation product.

GAETANO F. D'ALELIO.

CERTIFICATE OF CORRECTION.

Patent No. 2,327,771.  August 24, 1943.

GAETANO F. D'ALELIO.

It is hereby certified that error appears in the printed specification of the above numbered patent requiring correction as follows: Page 2, second column, line 9, for "modfiied" read --modified--; page 3, second column, lines 28 and 29, strike out the words "shown in any specific formula" and insert instead --specified--; line 61, for "trazine" read --triazine--; line 70, after "etc" and before the parenthesis insert a period; page 4, first column, line 27, for "(para-benzamide)" read --(semicarbazido)--; page 5, first column, line 21, for "acryloamide" read --acrylamide--; and that the said Letters Patent should be read with this correction therein that the same may conform to the record of the case in the Patent Office.

Signed and sealed this 2nd day of November, A. D. 1943.

(Seal)

Henry Van Arsdale,
Acting Commissioner of Patents.